Nov. 1, 1927.
W. E. BAILEY
COMBINATION DOUBLE BOILER AND STEAMER
Filed April 30, 1927
1,647,209
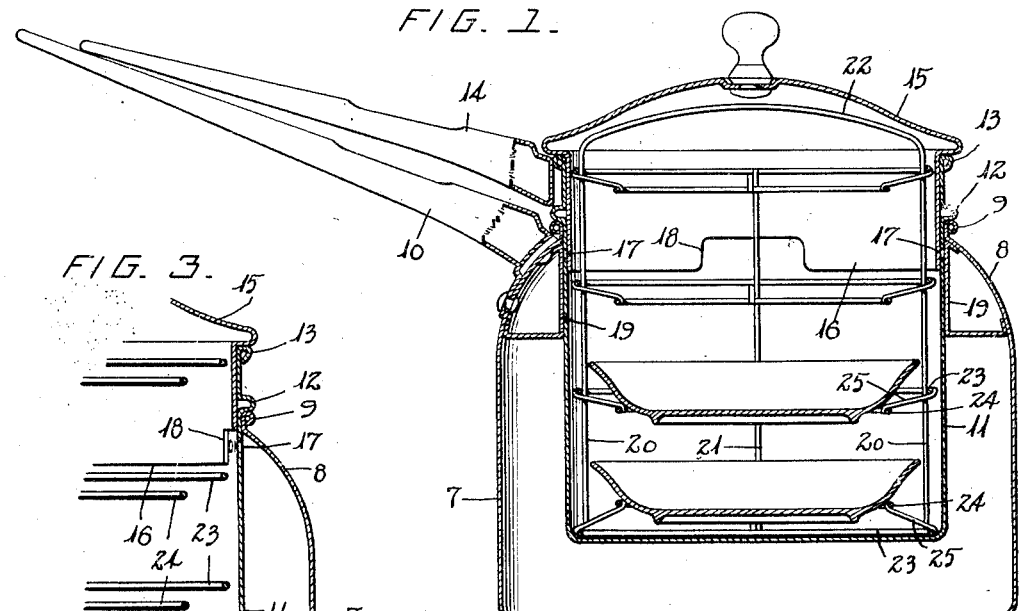
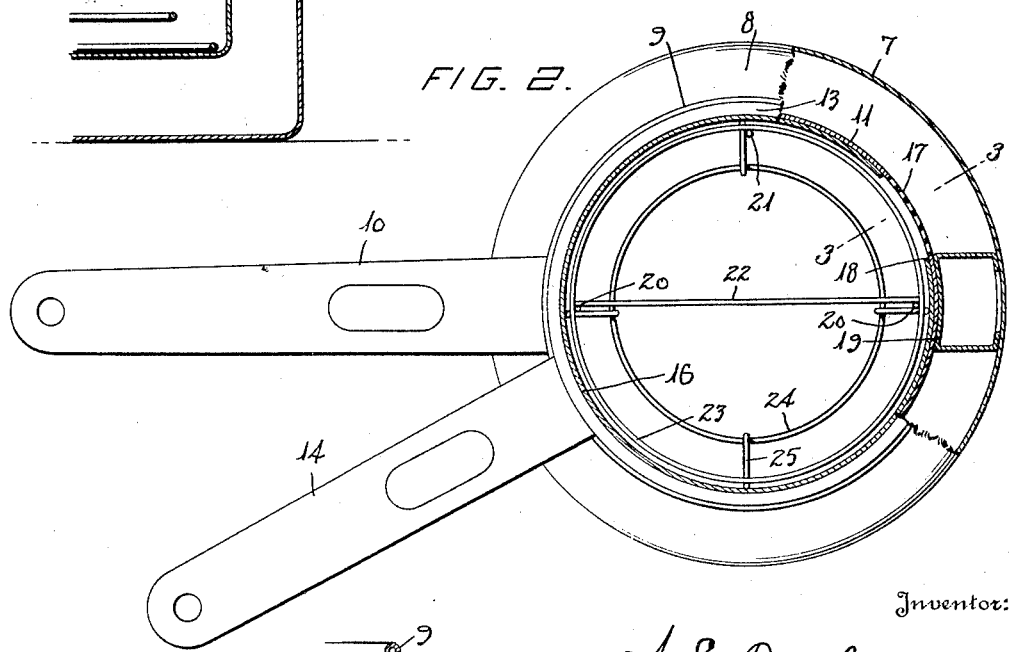
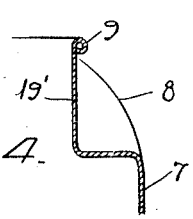

Patented Nov. 1, 1927.

1,647,209

UNITED STATES PATENT OFFICE.

WILLIAM ELMER BAILEY, OF MANSFIELD, OHIO.

COMBINATION DOUBLE BOILER AND STEAMER.

Application filed April 30, 1927. Serial No. 188,013.

The present invention relates to cooking utensils, and aims to provide a novel and improved device which may be used either as a double boiler or as a steamer.

Another object of the invention is the provision of a simple and convenient combination double boiler and steamer, which may be conveniently manufactured and which will be practical in use, being readily converted into either a double boiler or a steamer.

A further object is the provision of a cooking utensil of the kind indicated comprising outer and inner vessels, such as used in double boilers, with provisions whereby the turning movement of the vessels relatively to one another will convert the device into either a double boiler or a steamer.

A further object is the provision of a novel dish rack for use in the device for holding eggs or other edibles to be steamed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a median vertical section of the improved cooking utensil, portions being shown in elevation, showing the same when used as a double boiler, and also showing the dish rack.

Fig. 2 is a plan view of the device when used as a steamer, portions being broken away and shown in section.

Fig. 3 is a section on the line 3—3 of Fig. 2.

In its general construction, the present cooking utensil resembles an ordinary double boiler, being composed of the outer vessel or water container 7 having the shoulder 8 and bead 9 at its rim, and having a suitable handle 10. An inner vessel or receptacle 11 is suspended within the outer vessel 7, and has an outstruck rib 12 near its rim to seat on the bead 9 and support said inner vessel, the inner vessel also having a bead 13 at its rim. A suitable handle 14 is secured to the inner vessel 11 above the rib 12, and a cover or lid 15 has a flange or rim 16 to slip down within the rim of the vessel 11.

The construction above described is typical of an ordinary double boiler.

In carrying out the invention the wall of the inner vessel 11 is provided with apertures or ports 17 immediately below the rim of the outer vessel 7, or behind the shoulder 8, and, as shown, there are diametrically opposite sets of apertures 17, one set being directly adjacent to the handle 14 and the other set being opposite to the handle. In having the apertures so arranged it is possible to pour liquid from the vessel 11 without the liquid spilling through the apertures 17, the vessel 11 being tilted toward either side by holding the handle 14 in the hand and turning same in one direction or the other. The apertures 17 are for the purpose of admitting steam into the vessel 11 from the vessel 7 which contains water, as usual in double boilers.

The rim 16 of the lid 15 is of a length to extend across the apertures 17, as seen in Fig. 1, to close said apertures, and has diametrically opposite cut-away portions or openings 18 which may be brought into registration with the apertures 17, as seen in Figs. 2 and 3, so that the lid does not obstruct said apertures when using the device as a steamer. The lid 16 and vessel 11 or its handle 14 may have suitable marks for conveniently positioning the lid with the openings 18 in or out of registration with the apertures 17 as may be desired.

In order to close the apertures 17 when it is desired to use the device as a double boiler, abutments or members 19 are provided within the vessel 7, one adjacent to the handle 10 and the other diametrically opposite to said handle, and said abutments have curved portions snugly fitting the periphery of the vessel 11. The abutments or members 19 may be of sheet metal and may be welded, soldered, riveted or otherwise secured within the shoulder 8 of the vessel 7, or may be pressed-in portions of the shoulder 8, as seen at 19' in Fig. 4, or may be otherwise provided.

When the utensil is used as a double boiler, the handle 14 is positioned over the handle 10, and the apertures 17 will therefore be closed by the abutments 19, as seen in Fig. 1, and by positioning the lid 15 with the openings 18 out of registration with the apertures 17 said lid will also close the apertures. This enables the device to be used similar to an ordinary double boiler.

By turning the inner vessel 11 in the outer vessel, as shown in Fig. 2, which may be conveniently done by separating the handles, the apertures 17 are uncovered, being removed from the abutments 19, and by positioning the lid 15 with the openings 18 registering with the apertures 17, as seen in Figs. 2 and 3, the device is converted into a steamer. Thus, the water in the vessel 7 being boiled will result in the steam passing through the apertures 17 into the inner vessel 11 and steaming the contents thereof. Meats, cereals, vegetables, fruits and other edibles may thus be conveniently steamed, which is preferable over boiling, in that the juices are not dissolved as when boiling in water, and other benefits obtained. Furthermore, the water which enters the inner vessel as vapor is distilled, and the sediment remains in the outer vessel.

In order to support dishes within the vessel 11, a wire dish rack is provided. The rack has the diametrically opposite wire standards 20 and a third wire standard 21, the upper ends of the standards 20 being connected by a handle 22 bridging the body of the rack. Outer wire rings 23 are soldered or otherwise secured to the standards 20 and 21, and inner rings 24 are connected to the rings 23 by wire ties 25, thereby providing superposed shelves on which the dishes may be supported, as seen in Fig. 1, the side of the rack opposite to the standard 21 being open for conveniently inserting and removing the dishes. The rack may thus be conveniently employed for supporting vertically spaced dishes within the vessel 11, and the rack enables the dishes to be conveniently placed in and removed from the vessel. The dishes may be used for holding eggs for poaching, dumplings, meat and other foods for the convenient steaming thereof.

Having thus described the invention, what is claimed as new is:—

1. A combination double boiler and steamer comprising an outer vessel, an inner vessel therein having an aperture below its upper edge to admit steam from the outer vessel, and means for closing said aperture, in a predetermined relative position of said vessels.

2. A combination double boiler and steamer comprising an outer vessel, an inner vessel therein having an aperture below its upper edge to admit steam from the outer vessel, and means carried by the outer vessel for closing said aperture.

3. A combination double boiler and steamer comprising an outer vessel, an inner vessel therein having an aperture below its upper edge to admit steam from the outer vessel, and means carried by the outer vessel for closing said aperture when the vessels are turned to a predetermined position relatively to one another.

4. A combination double boiler and steamer comprising an outer vessel, and an inner vessel therein having an aperture below its upper edge to admit steam from the outer vessel, the outer vessel having a portion to close said aperture in a predetermined relative position of said vessels.

5. A combination double boiler and steamer comprising an outer vessel, and an inner vessel therein having an aperture below its upper edge to admit steam from the outer vessel, the outer vessel having an abutment bearing against the inner vessel and adapted to close said aperture in a predetermined position of the inner vessel when turned within the outer vessel.

6. A combination double boiler and steamer comprising an outer vessel, and an inner vessel therein having a handle at one side and having an aperture below its upper edge adjacent to said handle and a diametrically opposite aperture below its upper edge to admit steam from the outer vessel, the outer vessel having portions to close said apertures when the vessels are turned to a predetermined position relatively to one another.

7. A combination double boiler and steamer comprising an outer vessel having a handle at one side, and an inner vessel within the outer vessel having a handle at one side and having an aperture below its upper edge adjacent to its handle and a diametrically opposite aperture below its upper edge, the outer vessel having an abutment adjacent to its handle and a diametrically opposite abutment, said abutments fitting the inner vessel to close said apertures when the handles are moved together.

8. A combination double boiler and steamer comprising an outer vessel, an inner vessel movably supported therein having an aperture to admit steam from the outer vessel, the outer vessel having a portion to close said aperture when the inner vessel is moved to a predetermined position relatively to the outer vessel, and a lid for the inner vessel having a portion to move into or out of registration with said aperture to control the flow of steam through said aperture.

9. A combination double boiler and steamer comprising an outer vessel, an inner vessel rotatable therein having an aperture to admit steam from the outer vessel, the outer vessel having a portion to close said aperture when the vessels are turned to a predetermined position relatively to one another, and a lid having a rim to fit within the inner vessel and close said aperture, said rim having a cut-away portion to register with said aperture.

In testimony whereof I hereunto affix my signature.

WILLIAM ELMER BAILEY.